United States Patent [19]
Lenhart

[11] Patent Number: 6,042,490
[45] Date of Patent: Mar. 28, 2000

[54] SYSTEMS AND METHODS OF PLAYING GAMES IN THREE DIMENSIONS

[76] Inventor: Christopher W. Lenhart, 7707 N. Fiske Ave., Portland, Oreg. 97203

[21] Appl. No.: 08/899,988

[22] Filed: Jul. 24, 1997

Related U.S. Application Data

[60] Provisional application No. 60/022,659, Jul. 26, 1996.

[51] Int. Cl.[7] .................................................. A63B 67/00
[52] U.S. Cl. .......................................... 473/415; 473/479
[58] Field of Search .................................. 473/479, 415, 473/92; 482/27; 434/258

[56] References Cited

U.S. PATENT DOCUMENTS

| | | | |
|---|---|---|---|
| 2,253,586 | 8/1941 | Serkau . | |
| 2,761,181 | 9/1956 | Legeman | 473/479 |
| 3,484,953 | 12/1969 | Norheim . | |
| 4,457,509 | 7/1984 | St. Germain . | |
| 4,578,037 | 3/1986 | Macangus et al. . | |
| 4,700,565 | 10/1987 | Albuschkat . | |
| 4,715,598 | 12/1987 | Knight | 473/479 |
| 4,956,775 | 9/1990 | Klamer | 472/479 |
| 4,999,603 | 3/1991 | Mele | 473/479 |
| 5,209,702 | 5/1993 | Arenas . | |
| 5,462,505 | 10/1995 | Blair | 482/27 |
| 5,772,535 | 6/1998 | Murphy | 473/415 |

FOREIGN PATENT DOCUMENTS

| 2263644 | 8/1993 | United Kingdom | 473/92 |
|---|---|---|---|

*Primary Examiner*—Sam Rimell
*Attorney, Agent, or Firm*—Kolisch Hartwell Dickinson McCormack & Heuser

[57] ABSTRACT

A system and method for playing a game in three dimensions. The system includes a three-dimensional playing field at least partially surrounded by a volume-defining surface, and an air mover operatively connected to the playing field to produce a stream of air within the playing field. A goal may be formed within the playing field so that an object may be moved relative to the goal. An air control system may control the stream of air within the playing field, so that the stream of air within the playing field has a volume flow rate that may be varied substantially by the air control system within at least one selected area of the playing field. A sensor may be provided for sensing the location of an object within the playing field. Goggles may be provided for wearing by a player, the goggles including a display device interconnected to a computer processor to display an image controlled by the processor. The method may use the described system to play a game while suspended in a stream of air.

21 Claims, 4 Drawing Sheets

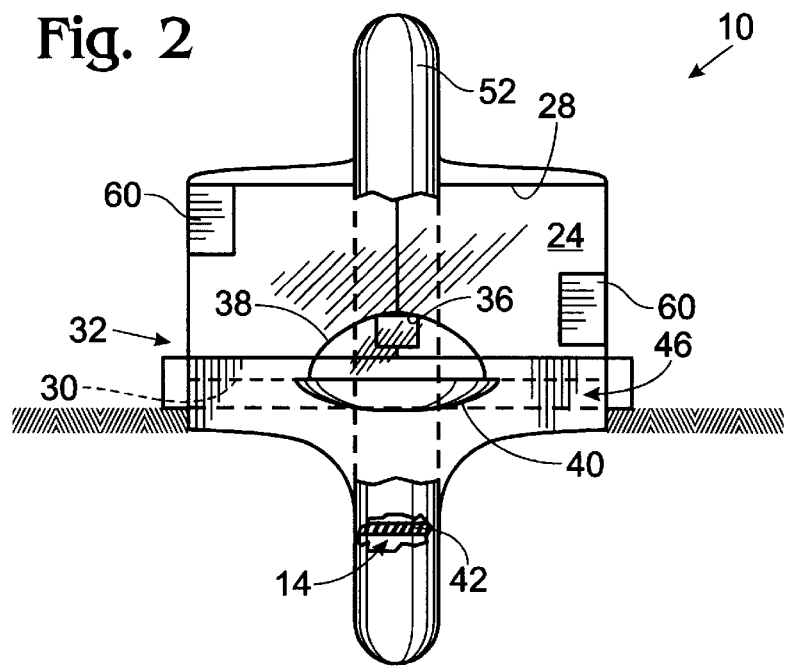
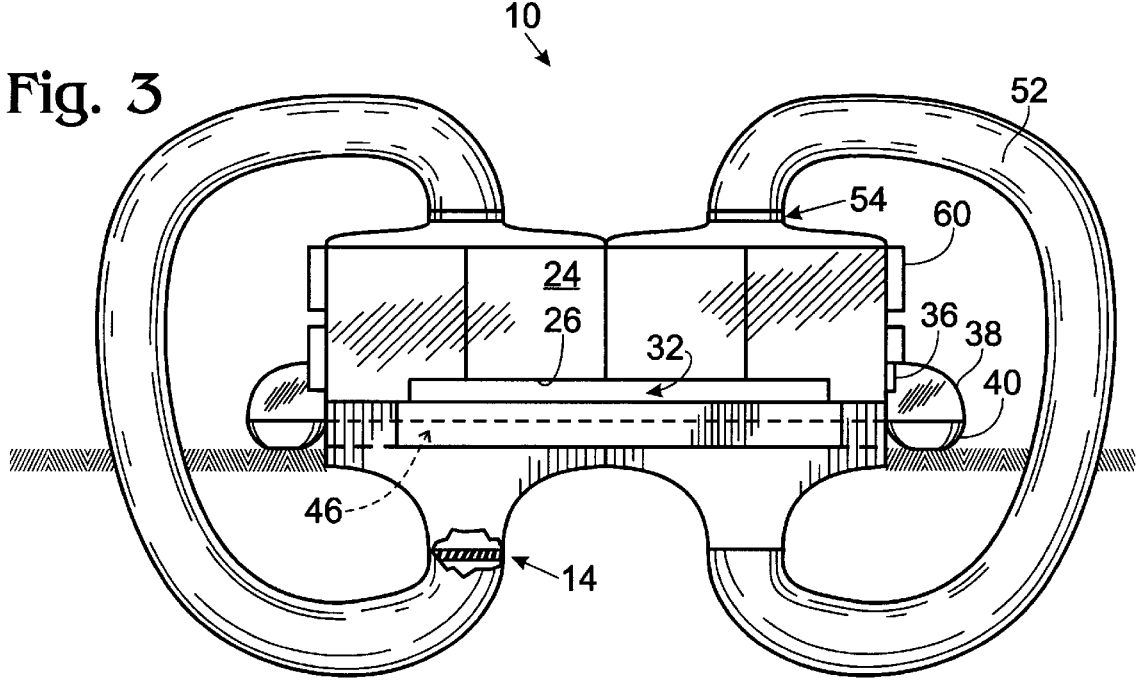

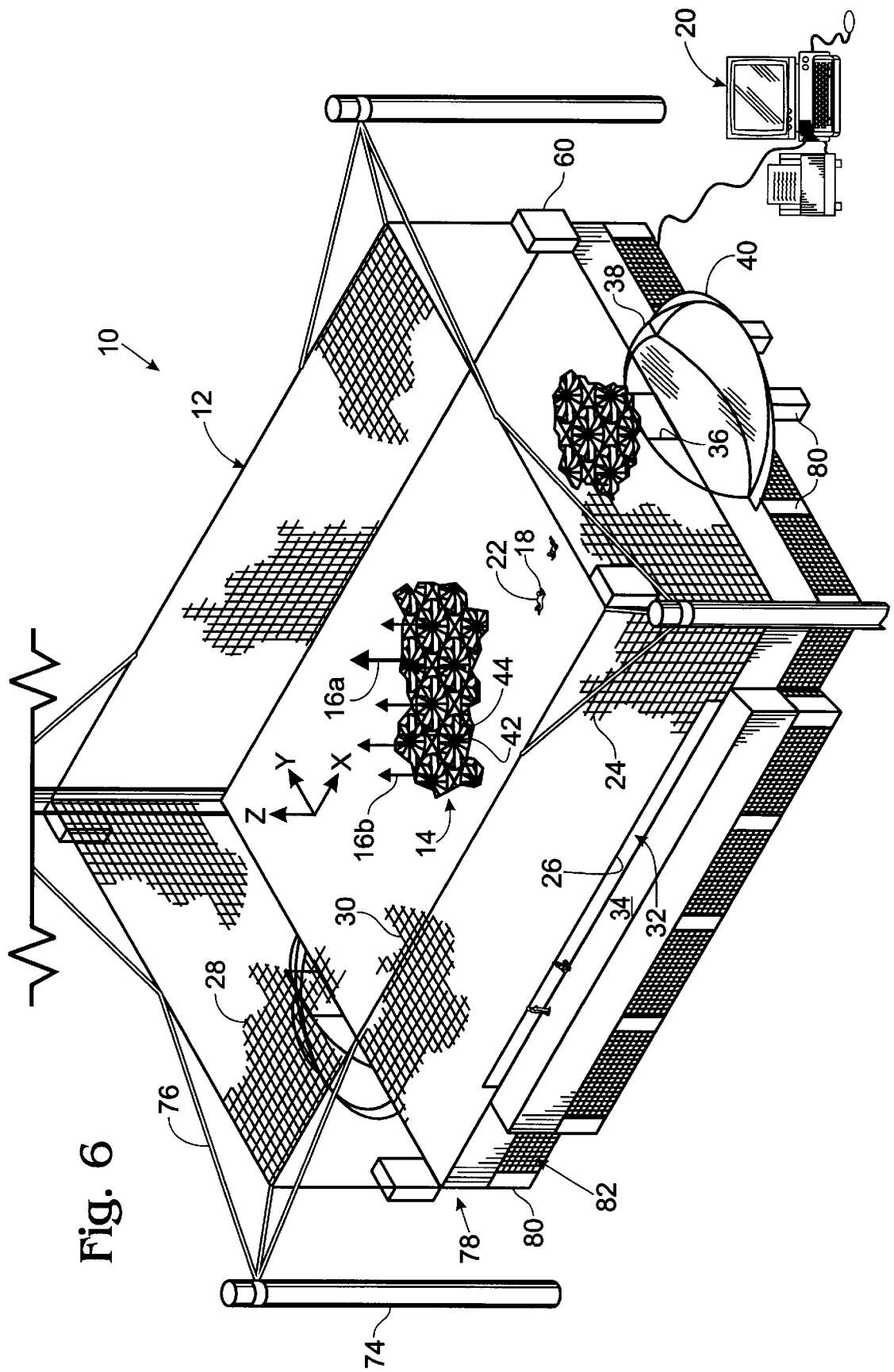

SYSTEMS AND METHODS OF PLAYING GAMES IN THREE DIMENSIONS

CROSS-REFERENCE TO RELATED APPLICATIONS

This application springs from, is based upon, and claims the benefit under 35 U.S.C. § 119 of prior-filed U.S. Provisional Patent Application Ser. No. 60/022,659, entitled THREE-DIMENSIONAL PLAYING FIELDS AND METHODS OF PLAYING GAMES IN THREE DIMENSIONS, filed on Jul. 26, 1996, incorporated herein by reference.

BACKGROUND AND SUMMARY OF THE INVENTION

The present invention relates generally to systems and methods for playing games in three dimensions by floating in a stream of air. The stream of air is used as the medium of motion, much as the ground is used as a medium of motion for walking. The systems include three-dimensional playing fields having updraft air movers that create a stream of air in which individuals and objects may be suspended. The methods include playing a game while suspended in a stream of air, which may be accomplished by use of updraft air movers, or by falling air.

Both the systems and the methods are, to some extent, an outgrowth or extension of skydiving. However, the structure and steps taught herein are unlike anything previously developed in the sport and occupation of skydiving. My invention allows humans to move from the two-dimensional limitations of conventional sports, into the three dimensions of flying.

By way of background, it is known to use updraft air movers to practice skydiving by generating a stream of air having a velocity in the range of 120–130 miles per hour Examples of such air movers and their associated enclosures are found in U.S. Pat. Nos. 4,700,565 and 5,209,702, incorporated herein by reference. These known air movers are quite small and limited in application, and should not be confused with my invented systems. The invented playing fields of my systems differ dramatically from the enclosures of these known air movers both in scale and structure, and incorporate various pieces of equipment to create a system for playing a game, as described below.

Each of my invented systems includes an air mover that creates an upward air flow sufficient to suspend a human user in a stream of air by matching the speed of the stream of air to the approximate terminal velocity of a free-falling human. The stream of air is directed into a three-dimensional playing field. Thus, a user may be suspended within the playing field in a state of free-fall.

The user may move up or down within the playing field by changing the exposed surface area of his or her body. An increase in exposed surface area results in an increase in the lifting force created by the stream of air, and a decrease in exposed surface area results in a decrease in lift. Lateral movement within the playing field may be achieved through similar changes, by adjusting the exposed surface area so that the lift created by the stream of air is directed at least partially in the direction of the desired movement.

One embodiment of the invented systems includes two giant air movers, each of which is a motorized fan surrounded by a housing or duct. The duct leads to a diffuser immediately below the playing field. Preferably, at least one portion or area of the diffuser is controllable so that the volume flow rate of the stream of air directed into the playing field varies substantially within at least one selected area of the playing field.

In another embodiment, numerous air movers are arranged in a grid of individual cells. Each air mover is located in a separate cell of the grid, surrounded by its own housing or duct In a preferred form of this embodiment, an air control system controls at least one of the air movers so that the volume flow rate of the stream of air is controllable within a selected area of the playing field by controlling at least one air mover.

There also are various embodiments of the playing field portion of the invented systems. One embodiment includes a grill-like cage suspended above the air movers by a vertical support, for example, posts and guy wires. The walls and ceiling of the cage allow the stream of air to dissipate, so that the velocity of the stream of air decreases within the playing field as it moves away from the air movers. In another embodiment, the walls of the playing field are nonporous, made, for example, from plexiglass, so that the velocity of the stream of air stays approximately constant as it moves away from the air movers.

In both of these embodiments of the field, one or more goals, which could be targets or basket-like enclosures, are formed within the field Also in both is a net stretched below the walls of the field to form a trampoline. This trampoline serves a safety function because it prevents individuals and other objects from falling into the air movers or the associated duct work, diffusers and the like, and it cushions a fall if the volume flow rate of the stream of air should decrease unexpectedly. The trampoline contributes to the usefulness of the overall system because it can be used as a rebound surface to provide a bouncing action for objects within the playing field. A similar trampoline-like structure may be provided for the walls and ceiling of the playing field, if desired.

The outer perimeter of the trampoline is surrounded by a padded boundary. A gap defined between the padded boundary and the bottom edge of the walls provides an entry through which players can enter and exit the playing field. The padded boundary preferably is outside the stream of air. The goals, discussed above, may coincide with this gap, or may be formed above or below the gap so that an object exits the moving stream of air when it enters the goal.

To play the game, players either stand on the trampoline or on the padded boundary. The air movers are activated, creating the necessary air flow. Players within the playing field then may be suspended in the stream of air, and can maneuver within the field as desired by changing the amount of their exposed surface area of their body, or by pushing off of the walls or ceiling of the field, or bouncing off of the trampoline. Players can exit the field by maneuvering to the outer perimeter of the field, passing through the entry gap, and landing on the padded boundary.

My invented system also may include various equipment used within the playing field to play a game. For example, it may include a ball that is sized and weighted so that its terminal velocity approximately matches the terminal velocity of a human falling in air. Thus, the ball may float somewhat equally with human players within the field. The system also may include devices to be worn by a human player to improve maneuverability, such as fins or webbed gloves.

Another example of optional equipment includes a computer connected to virtual reality goggles worn by a player. This equipment may be used in combination with a three-dimensional position sensor system to monitor the position and movement of the player or of some other object within the playing field. The goggles may create a visual display of a game environment, and the position sensor may pinpoint the location of the sensed object, human or otherwise, within the computer-created game environment Computer graphics may be used to display the movements of the player, other players and/or objects, or of simulated players/objects.

One embodiment of the method of playing the game includes the objective of moving a ball from one end to the other of the invented playing field. The game may be played by a group of players divided into teams and suspended in the stream of air in the field. Thus, the game may resemble a floating form of football, soccer, rugby or basketball. Alternatively, the object of the game may be for a player to progress from one side of the field to the other, maneuvering through suspended obstacles or avoiding other players in the process. Other variations could include the use of rackets, sticks, bats or mallets to propel a ball.

Yet another alternative embodiment of the method is to use one of the invented playing fields in combination with the computer, goggles and position sensors to create a three-dimensional, computer-coordinated simulator. The method could be used to simulate flight of an airplane or other vehicle, with the player's attitude and location within the playing field controlling the simulated vehicle. It also may be used to control movement within role-playing, adventure, exploration, or combat games, such as "Dungeons and Dragons" and "Doom."

This embodiment of the method may also simulate the games discussed briefly above, and in more detail below. A further modification of this embodiment of the method is to use a conventional skydiving simulator in combination with the computer, goggles and position sensor of my invented system, as described above. This further embodiment is believed to be significantly less expensive than the other embodiments discussed herein, and may lend itself more readily to commercialization of my invention.

It is an object of the present invention to provide a system and method for playing a game in three dimensions while suspended in a stream of air.

Additional objects and advantages of the present invention will be understood more readily after a consideration of the drawings and the Detailed Description.

BRIEF DESCRIPTION OF THE DRAWINGS

FIG. 2 is an elevational view of the end of the system shown in FIG. 1, with portions of the system cut away to show detail, shown on a smaller scale than in FIG. 1.

FIG. 3 is an elevational view of a side of the system shown in FIG. 2, with portions of the system cut away to show details.

FIG. 6 is an isometric view showing another embodiment of my invention, with portions of the playing field and associated equipment being cut away to expose details, shown on a smaller scale than in FIG. 1.

DETAILED DESCRIPTION OF THE PREFERRED AND ALTERNATIVE EMBODIMENTS

Figure 1:
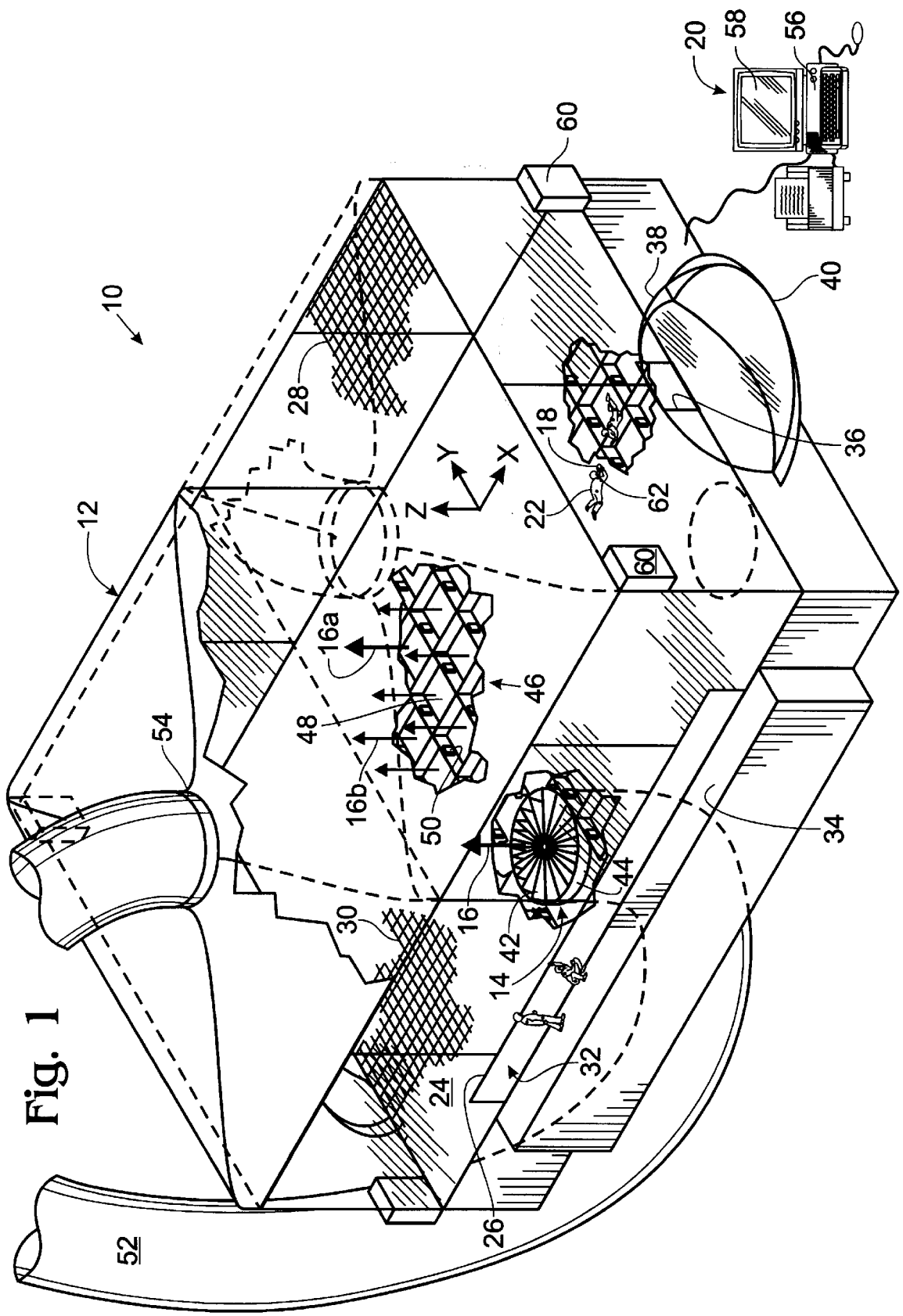
FIG. 1 is an isometric view showing one embodiment of the system of my invention, taken from above and to one side of an end of the system, the with portions of the system being cut away to expose details.
Figure 4:
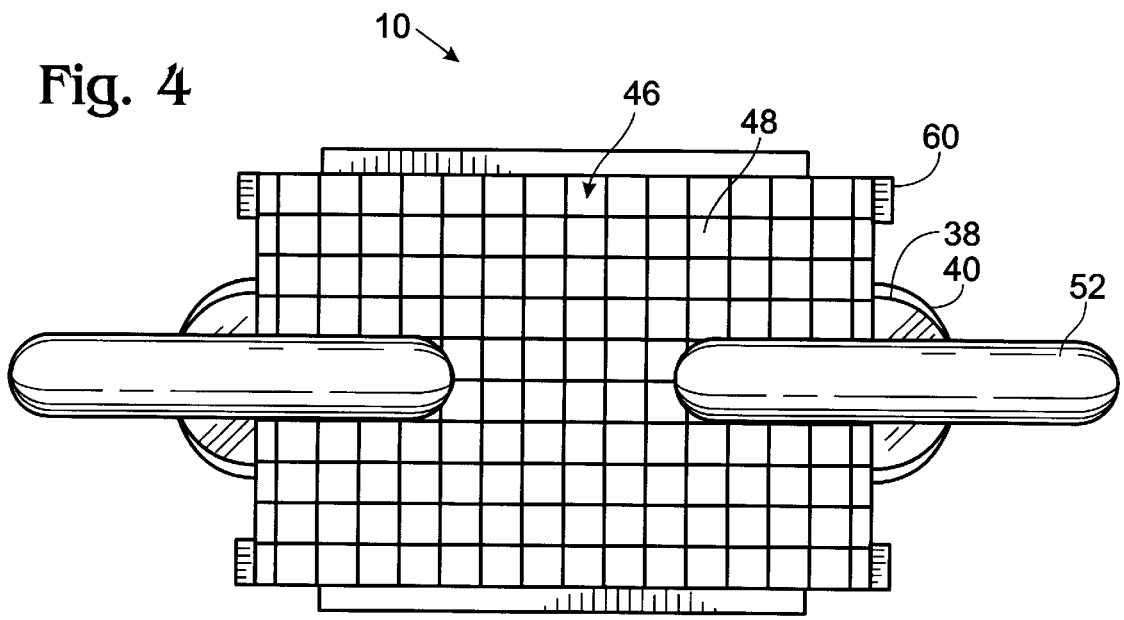
FIG. 4 is a top plan view of the system shown in FIG. 2, with much of the duct work cut away to expose details of the system.

A system for playing a game in three dimensions according to the present invention is shown in FIG. 1, indicated generally at 10. Selected aspects of system 10 also are shown in the elevation and plan views of FIGS. 2 through 4, so the reader may refer to these drawings as well while reading this description. System 10 includes a three-dimensional playing field 12, an air mover 14 operatively connected to playing field 12 to produce a stream of air 16 within playing field 12, a ball or other object 18 to act as a type of place keeper or marker that is movable within field 12, and a computer controlling/monitoring station indicated generally at 20. Human players 22 are shown within and around system 10.

Field 12 may be described as a cage or tank formed from volume-defining outer surfaces. These surfaces include sides or walls 24 having a lower or bottom edge 26, a top 28, and a bottom 30. Walls 24 are shown in FIG. 1 to be approximately 25-feet high, 60-feet wide, and 90-feet long. This results in bottom 30 having overall dimensions of approximately 60-feet by 90-feet Walls 24 may be formed of a clear impermeable material such as plexiglass. Both top 28 and bottom 30 are formed of a netting, with the netting for bottom 30 preferably being held or biased by springs or other devices so that bottom 30 may be used as a rebound surface or trampoline. If desired, walls 24 and top 28 also may be augmented by a spring-biased or elastic netting that may be used as a trampoline. In those embodiments in which surfaces 24, 28, and/or 30 are elastic or spring-biased, sufficient spacing should be allowed between the respective surface and any obstacles so that a user of playing field 12 is protected from impact with those obstacles.

An entry gap 32 is defined between bottom edge 26 of walls 24 and bottom 30. A padded boundary 34 is located just outside of entry gap 32. A goal 36 may be formed within playing field 12 as a designated or separated portion of entry gap 32, or as shown in FIG. 1, as a separate opening in wall 24. A goal surround 38 and a landing pad 40 may be formed as part of goal 36, as shown. In FIG. 1, entry gap 32 is shown approximately 4-feet high, and goal 36 is shown 4-feet high and 6-feet wide. Goal 36 is provided so that an object, such as ball 18 or player 22, may be moved within stream of air 16 in playing field 12 relative to goal 36.

Air mover 14 may be formed from a plurality of discrete air movers, with two such discrete air movers being shown in FIG. I in the form of motorized fans 42 each surrounded by a housing or duct 44. Duct 44 leads to a flow dividing system 46, preferably in the form of a diffuser having individual ports or cells 48, each cell 48 creating a discrete area of air flow operatively connected to playing field 12. The point at which duct 44 is divided into individual streams of air may be adjusted as desired, ranging from immediately adjacent fan 42 to immediately adjacent bottom 30 of field 12.

One or more of cells 48 may be fitted with an individual flow control 50, such as a damper, shutter, iris, bellows, or other constriction. In FIG. 1, flow controls 50 are shown adjacent bottom 30 of playing field 12. In those embodiments in which the stream of air within duct 44 is divided more closely to fan 42, controls 50 may be placed further down within duct 44. By operating individualized flow control 50 on a selected cell 48, a discrete area of air flow may be controlled to regulate the volume flow rate of air through the discrete area. In FIG. 1, this regulation of air flow is represented by the differences in size between arrow 16a and surrounding arrows 16b.

Controls 50 may be connected operatively to computer 20 to form collectively an air control system for controlling stream of air 16 within playing field 12. For example, the volume flow rate of air for each cell 48 may be regulated by the air control system and matched to the volume flow rates of other cells 48. Through the use of feedback control systems, not shown, the air control system thereby may ensure a constant volume flow rate throughout playing field 12. Alternatively, the air control system may be used to create a simulated topography within playing field 12, with certain areas having a high volume flow rate tending to push a user up within playing field 12, and other areas having a lower volume flow rate tending to allow the user to drop down within playing field 12. If the volume flow rate is varied substantially by the air control system within at least one selected area of playing field 12, a type of hill or valley may be created.

Computer 20 may be a conventional computer, as represented schematically in FIG. 1, including a processor 56 and a display device or monitor 58.

Various other devices may be interconnected to computer 20, and more particularly to processor 56. For example, a position sensing system may be provided, including position sensors 60 that sense a sensor target 62. Sensor 60 may be several distributed receivers each of which measures a distance between sensor 60 and sensor target 62. By obtaining at least three such distance measurements from different locations relative to playing field 12, processor 56 may receive a signal from sensor 60 indicating the exact position or location of target 62 within playing field 12. This would be determined much in the same way that the global-positioning satellite system determines the location of an object on the earth.

Figure 5:
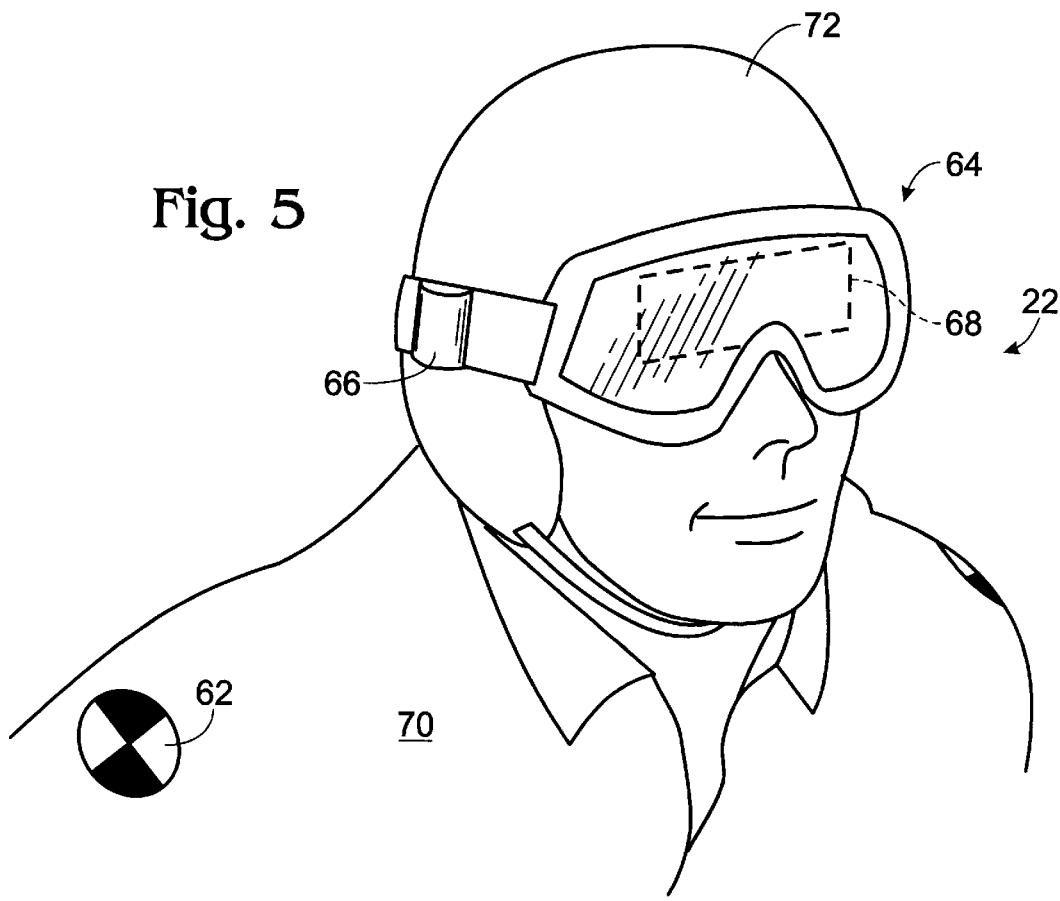
FIG. 5 is an isometric view of the head and shoulders of a player wearing portions of the system shown in FIG. 1, including goggles, helmet, and a jumpsuit, shown on a much larger scale than in FIG. 1.

Sensor target 62 may be a localized transmitter attached to ball 18, player 22, or other object. Referring briefly to FIG. 5, target 62 also may be a geometric pattern that may be perceived or tracked by a machine vision system. A plurality of targets 62 may be placed on a single object to define more precisely the orientation of that object within playing field 12. For example, target 62 may be placed individually on the shoulders, elbows, hands, hips, knees, and feet, of a player 22.

As another example, processor 56 may include a data transmitter to send data controlling a remote display, motor, damper, or other device. One such device includes individual flow controls 50, discussed above. Another device preferably attached or linked to processor 56 is shown in FIG. 5 in the form of goggles 64. Goggles 64 include a receiver 66 and a display device 68. Display device 68 also may be in the form of a heads-up display projected onto the lens of goggles 64, or onto a visor of a helmet, not shown. The heads-up display allows a user to see both the computer-created virtual display and the real-world surroundings.

The content of the image displayed on device 68 may relate to the object sensed within playing field 12 by sensor 60. The image also may relate to the volume flow rate of stream of air 16 within playing field 12. For example, the image may project a hill-like structure in a region relating to an area of playing field 12 having a substantially increased volume flow rate of air.

Player 22 may wear specialized articles of clothing such as a jumpsuit 70, also shown in FIG. 5, with jumpsuit 70 being part of system 10. Jumpsuit 70 may include, or be replaced or augmented by, various accessories, not shown. Padding, fins, webbed gloves, or other attachments and clothing may prove helpful in an aerial sport of the type described herein. For example, fins might be attached at the elbow, waist, knees, or ankles of the player 22. Wing flaps may be formed between the arms and body of jumpsuit 70 so that the wings may be used by the user extending their arms outwardly. Player 22 also may wear a helmet 72. Jumpsuit 70 and helmet 72, and any attached accessories, collectively define the exposed surface area of player 22.

Player 22 may move within field 12 by controlling the amount of exposed surface area. This may be accomplished by extending or folding one's arms or legs, and otherwise using one's body and any attached accessories or equipment to change one's lift and approach angle relative to stream of air 16. For reference in understanding these movements, X Y, and Z axes of movement are indicated in FIG. 1.

An alternative embodiment of system 10 is shown in FIG. 6. Many of the components of the above-described embodiment are included, and are labeled appropriately. In FIG. 6, walls 24 of field 12 are shown in the form of netting suspended from support posts 74 by cables or guy wires 76. Because of the difference in scale of FIG. 6 compared to FIG. 1, field 12 in FIG. 6 is approximately twice the size of field 12 in FIG. 1. Its playing area dimensions in FIG. 6 are approximately 50-feet high, 120-feet wide, and 180-feet long. Entry gap 32 is again shown approximately 4-feet high, and goal 36 is approximately 8-feet high and 12-feet wide.

The use of netting for walls 24 instead of the plexiglass shown for the corresponding surfaces in FIGS. 1 through 4 allows stream of air 16 to dissipate as it moves away from air movers 14. Tis dissipation of stream of air 16 changes the flight characteristics of an object within playing field 12. A similar effect could be accomplished by using plexiglass or other solid material for walls 24, provided that walls 24 are sloped outwardly so that walls 24 collectively define an inverted frustum of a pyramid. Furthermore, it is understood that, for either of the embodiments shown, walls 24 may be rounded or arcuate to define a cylinder, frustum of a cone, portion of a sphere, or some other curvilinear shape, as desired.

In the embodiment shown in FIG. 6, a plurality of discrete air movers 14, again shown as motorized fans 42 surrounded by ducts 44, replaces the two motorized fans 42 of FIGS. 1 through 4 with a distributed network of fans 42 contained in an elevated fan box 78. Each fan 42 is approximately 12-feet in diameter. Fan box 78 may be held aloft by stilts 80, with an air inlet 82 defined generally around the perimeter of fan box 78.

In the embodiment shown in FIG. 6, the volume flow rate of stream of air 16 may be varied within a selected area of playing field 12 by controlling one of air movers 14 to regulate the volume flow rate of air through that air mover. The variation in the volume flow rate of air within playing field 12 again is represented by arrows 16a and 16b, with the size of the arrow representing the volume flow rate of air through a particular motorized fan 42.

DETAILED DESCRIPTION OF THE PREFERRED AND ALTERNATIVE METHODS OF PRACTICING THE INVENTION

Systems 10, as described in various embodiments above, may be used to practice a method of playing various games in three dimensions. The method could include the step of providing ball 18 that is sized and weighted to match the terminal velocity of a human falling in air, the step of providing stream of air 16 using playing field 12, and the step of suspending ball 18 within stream of air 16. The step of suspending ball 18 may be accomplished either by allowing ball 18 to float freely, or by suspending in stream of air 16 a player 22 that is carrying or holding ball 18.

The method also may include the steps of players 22 entering stream of air 16 and moving ball 18 relative to stream of air 16, and more specifically relative to goal 36. The step of entering stream of air 16 may be accomplished either by entering playing field 12 through entry gap 32, or by standing on bottom 30 of playing field 12 while air movers 14 are activated. Alternatively, the step of providing stream of air 16 may be accomplished by diving from a substantially elevated position, in which case the step of entering stream of air 16 typically is accomplished by diving from an airplane (i.e., skydiving). Furthermore, while playing field 12, as described above, has been designed specifically for practicing the present method, it is envisioned that a conventional skydiving simulator, such as those disclosed in U.S. Pat. Nos. 4,700,565 and 5,209,702, may be used to accomplish the steps of suspending ball 18 and entering stream of air 16.

Numerous rules of play and game objectives may be developed, once one having ordinary skill in the art understands my invented system and method. By way of example, I describe below a few of the rules for games that I envision. My system and method are not limited, however, to these particular rules or games.

One such game would involve twelve players 22, divided into two teams of six players. Each team would be assigned one goal 36 as a target with another such goal 36 assigned to that team to be protected from access by the opposing team. The object of the game is for one of players 22 of a particular team to carry ball 18 through that team's designated target goal 36.

As ball 18 is moved by a particular team, those players 22 not currently possessing ball 18 could block or otherwise engage players 22 of the opposing team. Players 22 of the opposing team would attempt to intercept ball 18, either directly, or by halting forward progress of the particular player 22 currently in possession of ball 18. After forward progress has been halted for a specified period of time, for example, five seconds, ball 18 must be handed by player 22 to a member of the opposing team. Play would then resume with the opposing team now attempting to move ball 18 into its designated target goal 36.

For the given sizes of playing field 12, described above, players 22 may reach extremely high speeds within playing field 12. Accordingly, it will be necessary to impose strict safety-oriented rules. Computer 20, sensor 60, and goggles 64 provide a convenient way both to monitor compliance with such rules, and to help players 22 conform with the rules. For example, if a player 22 exceeds a designated speed relative to other players 22 or outer surfaces of playing field 12, a warning could be flashed on goggle display device 68. Similarly, other warnings could be displayed if player 22 ventures too close to the outer surfaces of playing field 12. The warning may be either in text form, or in some other visual format, such as a change in the background color of the image displayed on display device 68.

Goggles display device 68 also may be put to other uses. For example, at certain phases of playing a game, a particular player 22 may need to be in a designated location within playing field 12, and visual indicators could be displayed on display device 68 to show the required direction of movement by player 22 to move to the designated location. The image displayed also could include virtual objects, either in the form of other players, or suspended targets or obstacles. The display of simulated players is useful in providing a single player simulation of a multi-player game. The display of targets or obstacles also is useful for such a game, and may be used to play various forms of computer-based games, such as flight simulators, or three-dimensional adventure/exploration/combat games.

From the foregoing identification of the elements and steps of the preferred and alternative embodiments, numerous different embodiments may be described. Therefore, while the present invention has been shown and described by reference to preferred embodiments, it will be apparent to those skilled in the art that other changes in form and detail may be made therein without departing from the spirit and scope of the invention defined in the appended claims.

I claim:

1. A system for playing a game in three dimensions, the system comprising:
    a three-dimensional playing field at least partially formed by volume-defining outer surfaces;
    an air mover operatively connected to the playing field to produce an upwardly directed stream of air having a velocity in the range of 120–130 miles per hour;
    a goal formed within the playing field;
    an object to be moved within the playing field relative to the goal;
    a sensor for sensing the location of the object within the playing field;
    a computer processor interconnected to the sensor for receiving a signal from the sensor indicating the location of the object within the playing field; and
    goggles including a display device interconnected to the processor to display an image controlled by the processor.

2. The system according to claim 1, wherein the object to be moved is a ball.

3. The system according to claim 1, further comprising an air control system for controlling the stream of air within the playing field, wherein the stream of air within the playing field has a volume flow rate that may be varied substantially by the air control system within at least one selected area of the playing field.

4. The system according to claim 3, further comprising a diffuser having a plurality of discrete areas of air flow operatively connected to the playing field, wherein the air control system controls at least one of the discrete areas of air flow to regulate the volume flow rate of air through the at least one of the discrete areas.

5. The system according to claim 3, wherein the air mover includes a plurality of discrete air movers, each discrete air mover operatively connected to the playing field to produce a stream of air within the playing field, wherein the air control system controls at least one of the discrete air movers to regulate the volume flow rate of air through the at least one of the discrete air movers.

6. A system for playing a game in three dimensions, the system comprising:
    a three-dimensional playing field at least partially formed by a volume-defining outer surface;
    an air mover operatively connected to the playing field to produce an upwardly directed stream of air having a velocity in the range of 120–130 miles per hour;

an air control system for controlling the stream of air within the playing field, wherein the stream of air within the playing field has a volume flow rate that may be varied substantially by the air control system within at least one selected area of the playing field;

an object to be moved within the playing field to a location;

a sensor for sensing the location of the object within the playing field;

a computer processor interconnected to the sensor for receiving a signal from the sensor indicating the location of the object within the playing field; and goggles including a display device interconnected to the processor to display an image controlled by the processor.

7. The system according to claim 6, further comprising a diffuser having a plurality of discrete areas of air flow operatively connected to the playing field, wherein the air control system controls at least one of the discrete areas of air flow to regulate the volume flow rate of air through the at least one of the discrete areas.

8. The system according to claim 6, wherein the air mover includes a plurality of discrete air movers, each discrete air mover operatively connected to the playing field to produce a stream of air within the playing field, wherein the air control system controls at least one of the discrete air movers to regulate the volume flow rate of air through the at least one of the discrete air movers.

9. A system for playing a game in three dimensions, the system comprising:

a three-dimensional playing field at least partially formed by a volume-defining outer surface;

an air mover operatively connected to the playing field to produce an upwardly directed stream of air having a velocity in the range of 120–130 miles per hour;

an object to be moved within the playing field to a location;

a sensor for sensing the location of the object within the playing field;

a computer processor interconnected to the sensor for receiving a signal from the sensor indicating the location of the object within the playing field; and goggles including a display device interconnected to the processor to display an image controlled by the processor.

10. The system according to claim 9, further comprising a ball, wherein the object to be moved within the playing field is the ball.

11. The system according to claim 9, further comprising a goal formed within the playing field so that the object may be moved relative to the goal.

12. The system according to claim 9, further comprising an air control system for controlling the stream of air within the playing field, wherein the stream of air within the playing field has a volume flow rate that may be varied substantially by the air control system within at least one selected area of the playing field.

13. The system according to claim 12, further comprising a diffuser having a plurality of discrete areas of air flow operatively connected to the playing field, wherein the air control system controls at least one of the discrete areas of air flow to regulate the volume flow rate of air through the at least one of the discrete areas.

14. The system according to claim 12, wherein the air mover includes a plurality of discrete air movers, each discrete air mover operatively connected to the playing field to produce a stream of air within the playing field, wherein the air control system controls at least one of the discrete air movers to regulate the volume flow rate of air through the at least one of the discrete air movers.

15. The system according to claim 9, wherein the image relates to the object sensed within the playing field and the volume flow rate of the stream of air within the at least one selected area of the playing field.

16. A system for playing a game in three dimensions, the system comprising:

a three-dimensional playing field at least partially formed by volume-defining outer surfaces;

an air mover operatively connected to the playing field to produce a stream of air within the playing field;

a goal formed within the playing field so that an object may be moved relative to the goal;

an object to be moved within the playing field to a location;

a sensor for sensing the location of the object within the playing field;

a computer processor interconnected to the sensor for receiving a signal from the sensor indicating the location of the object within the playing field; and goggles including a display device interconnected to the processor to display an image controlled by the processor.

17. A system for playing a game in three dimensions, the system comprising:

a three-dimensional playing field at least partially formed by a volume-defining outer surface;

an air mover operatively connected to the playing field to produce a stream of air within the playing field;

an object to be moved within the playing field to a location;

a sensor for sensing the location of the object within the playing field;

a computer processor interconnected to the sensor for receiving a signal from the sensor indicating the location of the object within the playing field; and goggles including a display device interconnected to the processor to display an image controlled by the processor.

18. The system according to claim 17, further comprising an air control system for controlling the stream of air within the playing field, wherein the stream of air within the playing field has a volume flow rate that may be varied substantially by the air control system within at least one selected area of the playing field.

19. The system according to claim 18, further comprising a diffuser having a plurality of discrete areas of air flow operatively connected to the playing field, wherein the air control system controls at least one of the discrete areas of air flow to regulate the volume flow rate of air through the at least one of the discrete areas.

20. The system according to claim 19, wherein the image relates to the object sensed within the playing field and the volume flow rate of the stream of air within the at least one selected area of the playing field.

21. The system according to claim 18, wherein the air mover includes a plurality of discrete air movers, each discrete air mover operatively connected to the playing field to produce a stream of air within the playing field, wherein the air control system controls at least one of the discrete air movers to regulate the volume flow rate of air through the at least one of the discrete air movers.

* * * * *